3,298,789
**TEST ARTICLE FOR THE DETECTION
OF GLUCOSE**
Raymond L. Mast, Elkhart, Ind., assignor to Miles Laboratories, Inc., Elkhart, Ind., a corporation of Indiana
No Drawing. Filed Dec. 14, 1964, Ser. No. 418,340
1 Claim. (Cl. 23—253)

The present invention relates to a test article useful for detecting glucose in a fluid, such as blood. More particularly, the invention relates to a test article having an improved composition which provides more accurate quantitative determination of glucose levels in blood than prior art test articles.

The detection of glucose in body fluids, such as urine or blood, as well as the determination of its concentration therein is of great importance to diabetic patients who must control their diets so as to regulate their sugar intake and who must frequently be guided in this regard by a regular check on glucose in their body fluids. A test article for qualitatively and quantitatively determining glucose can also be used efficiently in routine glucose analyses of body fluids in hospitals and physicians' offices, in diabetes detection screening programs, in the differentiation of glucose from other sugars, and the like.

Because early diagnosis and continued control are so important in diabetes, a glucose test, to be of greatest value, must be conveniently rapid, simple enough to serve the clinician, and sensitive enough to reflect variations in the patient's condition. Moreover, the reagent composition must be adequately stable.

One test article that has been used in the prior art for the detection of glucose in fluids is described in U.S. Patent No. 3,092,465, issued to E. C. Adams, Jr. and R. R. Smeby on June 4, 1963. This prior art test article was particularly useful in detecting glucose in blood. It contained a test mixture impregnated on a bibulous material. The impregnated mixture contained glucose oxidase, peroxidase, o-tolidine dihydrochloride as an indicator, and a citric acid-sodium citrate buffer mixture. A semi-permeable coating, such as cellulose acetate, covered the impregnated portion of the bibulous material.

The principles underlying the basic reactions of enzyme tests for glucose are well known. Glucose oxidase catalyzes the aerobic oxidation of glucose to produce gluconic acid and hydrogen peroxide. A substance having peroxidative activity is then capable of inducing the oxidation of an indicator, such as o-tolidine, in the presence of the hydrogen peroxide formed by the glucose oxidase. The amount of oxidation of the dye, and thus its resulting shade of color, is thus directly related to the amount of glucose present in the sample being tested.

When a test article containing glucose oxidase, peroxidase and an oxidizable dye is contacted with a blood sample, the blood cells tend to stain the test article and thus interfere with proper interpretation of the color produced by oxidation of the dye. The test article described in the above-mentioned U.S. patent has a semi-permeable coating over the impregnated test portion of the test article. This semi-permeable coating allows water and glucose from a test sample to pass through the coating material and react with the test composition while screening or preventing the larger molecules, such as blood cells, from passing through and interfering with desired color formation in the test composition. Since the blood cells do not contact the test composition but remain separated therefrom by the coating film and remain on the outer surface thereof, they are readily wiped off with a tissue or washed from the coating with water.

While the above described prior art test article was a distinct advance in the art, it had some disadvantages in manufacture and in use. The single indicator aided in qualitative detection of glucose in blood, for example, but it did not provide sufficient gradations in color spectrum to provide desired levels of accuracy for quantitative glucose determinations. Its particular buffer system also did not provide the most desired color developing conditions. The specific disclosed coating materials employed to form the semi-permeable outer layer left something to be desired as to convenience of application and in formation of a closely bonded uniform coating.

It is an object of the present invention to provide a test article for detecting glucose in fluids which has improved sensitivity for quantitative glucose determinations.

It is a further object to provide a test article especially useful for detecting glucose in blood which is more convenient to produce and has improved detection characteristics over prior art test articles.

In accordance with the present invention, a test article for detecting glucose in a fluid is provided which comprises a bibulous material containing impregnated therein a mixture which comprises an enzyme system having glucose oxidase activity, a substance having peroxidative activity, polyvinylpyrrolidone, a derivative of an interpolymer of methylvinyl ether and maleic anhydride, said derivative being selected from the class consisting of the acid form and the partial ester form, a buffer system consisting essentially of tris(hydroxymethyl)aminomethane, malonic acid and disodium malonate, and an indicator mixture which is oxidized in the presence of peroxide and said substance having peroxidative activity and changes color thereupon, said indicator mixture consisting essentially of 2,7-diaminofluorene dihydrochloride, o-tolidine dihydrochloride and benzidine dihydrochloride. When this test article is used to detect glucose in blood, it has a semi-permeable coating of transparent ethyl cellulose film which forms a continuous smooth layer over the impregnated bibulous material.

The glucose oxidase employed in the above described composition is preferably a purified glucose oxidase in a relatively concentrated form. Most preferably, the glucose oxidase is substantially free of catalase. The glucose oxidase is conveniently employed in the form of a liquid containing about 1000 glucose oxidase units per ml. of liquid glucose oxidase. A glucose oxidase unit is well known in the enzyme art to represent the amount of glucose oxidase that will catalyze the oxidation of a glucose substrate containing 3.3 weight percent glucose monohydrate with 10 microliters of oxygen per minute at 35° C. and pH 5.1 over a 15 minute period. It should be understood that any enzyme system having glucose oxidase activity can be used in the present invention.

The substances having peroxidative activity which can be used in the present invention can be chosen from various organic and inorganic sources. The various plant peroxidases, such as horseradish peroxidase or potato peroxidase, can be used. There can also be used small measured portions, capable of producing little coloration or a definitely predetermined color background effect, of such substances as normal whole blood, red blood cells alone, lyophylized whole blood and like substances having peroxidative activity. Inorganic compounds having peroxidative activity, such as mixtures of potassium iodide and sodium molybdate, as well as other iodides, such as sodium and ammonium iodides, and other molybdates, such as potassium and ammonium molybdates, can be used. In addition, urohemin and a number of other porphyrin substances having peroxidative activity can be used. Various complex-forming compounds which activate metalloporphyrins, but which are not operable per se can be used therewith, such as 2-aminobenzothiazole, pyridine, bipyridyl, bipyridylpyridine, nicotinic acid or the like. Other substances which are not enzymes but have peroxidative activity include such compounds as iron sulfocyanate, iron tannate, ferrous ferrocyanide, potassium chromic sulfate and the like.

The interpolymer of methylvinyl ether and maleic anhydride useful in the formation of the novel test article of the present invention is an equimolar reaction product of methylvinyl ether and maleic anhydride and is represented by the following formula:

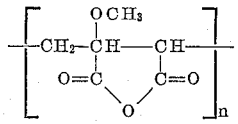

wherein $n$ is a positive number and is of sufficient value to provide a composition having a specific viscosity of about 0.1 to about 3.5 as measured on a 1 weight percent solution in methyl ethyl ketone at 25° C. This interpolymer is marketed commercially under the trademark "Gantrez AN" by the General Aniline and Film Corporation. When the interpolymer is dissolved in water, it forms an acid derivative having the following unit formula:

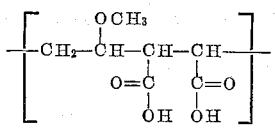

When the interpolymer is dissolved in an alcohol having the formula ROH, wherein R represents the organic moiety, it forms a partial ester derivative having the following unit formula:

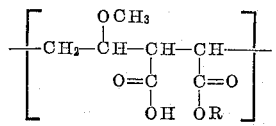

Since the test articles of the present invention are prepared from aqueous alcohol solutions, the test composition in the final product will contain either the acid derivative or the partial ester derivative or a mixture of said derivatives.

The presence of the above described interpolymer derivatives along with polyvinyl pyrrolidone having, for example, an average molecular weight of about 40,000 greatly enhance the color formed when the indicators are oxidized by peroxidase in the presence of hydrogen peroxide obtained from the glucose being analyzed. This enhancement of color aids in more sharply defining different colors or color shades for different levels of glucose content in a given sample. This is particularly important in obtaining a glucose test which can detect the presence of an incipient diabetic condition, for example.

The indicator mixture employed in the present invention consists essentially of 2,7-diaminofluorene dihydrochloride, o-tolidine dihydrochloride and benzidine hydrochloride. This combination of indicators enables a color spectrum to be obtained which ranges from gray, representing about 40 mg. glucose per 100 ml. blood, through purple, representing about 130 mg. glucose per 100 ml. blood, to blue, representing about 250 mg. glucose per 100 ml. blood. Actually a seven-part spectrum is obtained having distinct color shades for 40, 65, 90, 130, 150, 200 and 250 mg. glucose per 100 ml. blood. While these indicators individually have been known to be useful in test for glucose, their specific combination along with the above described polyvinyl pyrrolidone and interpolymer of methylvinyl ether and maleic anhydride provide a substantial advance in the technology of obtaining sharp reproducible readings at given glucose levels, especially in blood.

The composition employed in the novel test article to measure glucose in blood, for example, should be maintained at a pH level in the range of about pH 4.0 to 7.5. A buffer system consisting essentially of tris(hydroxymethyl)aminomethane, malonic acid and disodium malonate has been found to be most useful in this regard.

The novel test articles are prepared by impregnating a bibulous material base member with the above described composition dissolved in an aqueous alcohol medium. This impregnation can be achieved either by dipping the bibulous material into the liquid composition or by flowing the liquid composition into contact with the surface of the bibulous material. The resulting impregnated bibulous material is then suitably dried. When the test composition is to be used preferably for detecting glucose in blood, the surface of the impregnated bibulous material is then covered with a semi-permeable transparent coating film of ethyl cellulose. This is accomplished by applying a layer of ethyl cellulose dissolved in benzene, for example, to the surface of the impregnated bibulous material and then removing the solvent by evaporative drying.

The invention will be further described in the following example.

*Example*

A polyvinyl pyrrolidone solution was prepared by mixing 30 g. of polyvinylpyrrolidone having an average molecular weight of about 40,000 with 233 ml. of distilled water at 100° C. and agitating until thoroughly dissolved. The solution was then cooled to room temperature.

A buffer solution was prepared by mixing 48.4 g. of tris(hydroxymethyl)aminomethane, 20.0 g. of malonic acid, and 34.5 g. of disodium malonate with 140 ml. of distilled water at room temperature and agitating until thoroughly dissolved. The resulting buffer solution had a pH of 7.0.

An interpolymer solution was prepared by mixing 11.67 g. of "Gantrez AN 139," an interpolymer of methylvinyl ether and maleic anhydride marketed by General Aniline and Film Corporation, with 233 ml. of distilled water at 100° C. and agitating until thoroughly dissolved. The solution was cooled to room temperature and diluted to 233 ml. with distilled water.

An indicator solution was prepared by mixing 200 ml. of 95 volume percent aqueous ethanol, 0.83 g. of 2,7-diaminofluorene dihydrochloride, 1.66 g. of o-tolidine dihydrochloride, 2.83 g. of benzidine dihydrochloride and 133 ml. of distilled water at 100° C. and agitating until thoroughly dissolved.

An enzyme solution was prepared by mixing 0.533 g. of horseradish peroxidase, 33 ml. of distilled water and 68 ml. of liquid glucose oxidase having activity of about 1000 glucose oxidase units/ml. and stirring until thoroughly dissolved.

The above prepared indicator solution, interpolymer solution and buffer solution were mixed thoroughly together. To this mixture was added the polyvinylpyrrolidone solution and then mixed thoroughly. The enzyme solution was then added to the overall mixture and thoroughly agitated.

The above prepared liquid blend was then applied to the surface of a bibulous filter paper base member. The resulting impregnated bibulous material was then dried at about 87° C. for 10 minutes. A 1.25 weight percent solution of ethyl cellulose in benzene was then applied over the entire surface portions of the impregnated bibulous material and the resulting coated impregnated bibulous material was dried at 87° C. for 8 minutes.

The resulting test article was then used to measure the glucose levels in samples of blood containing known amounts of glucose. A portion of blood was placed on the coated impregnated portion of the impregnated bibulose material so as to cover the entire impregnated portion. The blood was allowed to remain in contact with the coated bibulous material for one mniute. The blood was removed by wiping with tissue paper or it was washed off with a sharp stream of water. The color of the impregnated bibulous material was then compared with a color chart having color blocks representing specific blood glucose levels. The test article was able to accurately determine the blood glucose levels.

This test article has sharper color distinctions between different blood glucose levels than any of the prior art blood glucose test articles.

In summary, the present invention relates to an improved test article which is especially useful for measuring blood glucose levels. This test article is a bibulous material impregnated with a composition comprising a glucose oxidase, peroxidase, polyvinylpyrrolidone, interpolymer derivative of methylvinyl ether and maleic anhydride, a specific buffer system and a specific color indicator composition. This impregnated bibulous material is also covered with an ethyl cellulose semi-permeable film.

What is claimed is:

A test article for detecting glucose in a fluid which comprises a bibulous material containing impregnated therein a mixture which consists essentially of an enzyme system having glucose oxidase activity, a substance having peroxidative activity, polyvinylpyrrolidone, a derivative of an interpolymer of methylvinyl ether and maleic anhydride, said derivative being selected from the class consisting of the acid form and the partial ester form, a buffer system consisting essentially of tris(hydroxymethyl)-aminomethane, malonic acid and disodium malonate, and an indicator mixture which is oxidized in the presence together of both peroxide and said substance having peroxidative activity and which changes color thereupon, said indicator mixture consisting essentially of 2,7-diaminofluorene dihydrochloride, o-tolidine dihydrochloride and benzidine dihydrochloride, said test article also having a semi-permeable coating of transparent ethyl cellulose film over the impregnated bibulous material.

References Cited by the Examiner

UNITED STATES PATENTS

| | | | |
|---|---|---|---|
| 2,872,369 | 2/1959 | Robinson | 260—78.3 |
| 2,893,844 | 7/1959 | Cook. | |
| 3,008,879 | 11/1961 | Harvill. | |
| 3,050,373 | 8/1962 | Collins. | |
| 3,066,081 | 11/1962 | Rorem et al. | 195—103.5 |
| 3,069,330 | 12/1962 | Babson | 195—103.5 |
| 3,092,465 | 6/1963 | Adams | 23—253 |
| 3,140,256 | 7/1964 | Martin et al. | 210—23 |
| 3,145,086 | 8/1964 | Free | 23—253 |
| 3,183,173 | 5/1965 | Oakes | 195—103.5 |

OTHER REFERENCES

Hamer, et al.: N.B.S.J. of Research, vol. 24 Jan.–June 1940, R.P. 1284, pp. 269–292.

MORRIS O. WOLK, *Primary Examiner.*

JOSEPH SCOVRONEK, *Examiner.*

ZOLTAN PAROCZAY, *Assistant Examiner.*